United States Patent Office 3,249,602
Patented May 3, 1966

3,249,602
19-SUBSTITUTED-20-KETO-10α-PREGNENES
Alexander D. Cross, Mexico City, Mexico, assignor to Syntex Corporation, Panama, Panama, a corporation of Panama
No Drawing. Filed June 15, 1964, Ser. No. 375,384
22 Claims. (Cl. 260—239.55)

The present invention relates to novel cyclopentanophenanthrene derivatives and to a process for the production thereof.

More particularly, the present invention relates to novel 10α-19-substituted pregnane derivatives and to novel 10α-19-substituted corticoid hormone derivatives.

The novel compounds of the present invention are represented by the following formulae:

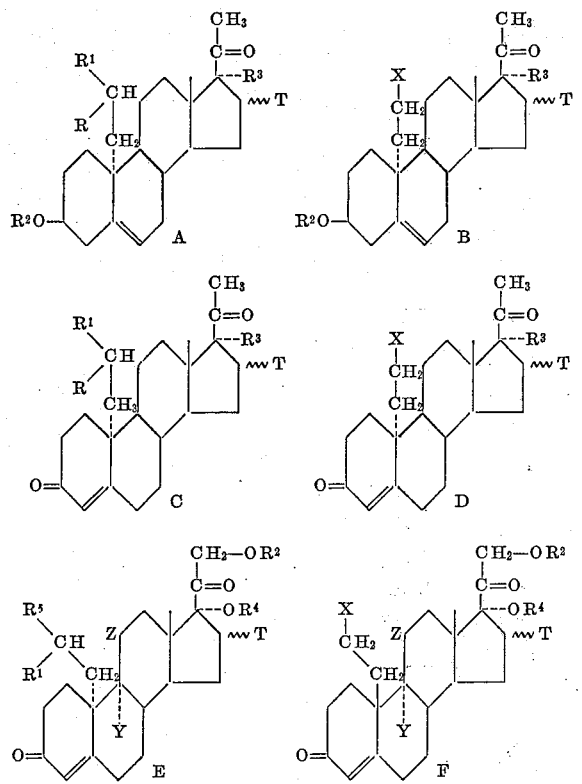

In the above formulae, R represents hydroxyl, tosyloxy, a hydrocarbon carboxylic acyloxy group of less than 12 carbon atoms or a cyano group; $R^5$ represents hydroxyl, a hydrocarbon carboxylic acyloxy group of less than 12 carbon atoms or a cyano group; $R^1$ may be hydrogen; R and $R^1$ taken together, and $R^5$ and $R^1$ taken together, represent an oxo group or a methylene grouping; $R^2$ represents hydrogen or a hydrocarbon carboxylic acyl group of less than 12 carbon atoms; $R^3$ represents hydrogen, hydroxyl or a hydrocarbon carboxylic acyloxy group of less than 12 carbon atoms; $R^4$ represents hydrogen; T represents hydrogen or methyl; $R^3$ and T taken together and $OR^4$ and T taken together, represent a 16α,17β-lower alkylidene-dioxy grouping; ⸞ indicates that the substituent attached thereby to the steroid nucleus may have the α or β configuration; X represents a halogen atom having an atomic weight of less than 125; Y may be hydrogen or a halogen atom having an atomic weight of less than 125; and Z may be a β-hydroxyl group or an oxo group.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by Formulae A, B, C and D are powerful progestational agents with good oral activity. In addition, they have anti-androgenic, anti-gonadotropic and anti-estrogenic properties and are very useful in fertility control. Furthermore, they may be used in the treatment of premenstrual tension and exhibit blood chlosterol lowering and diuretic activities. When applied topically, these compounds are very useful in the treatment of acne.

The compounds represented by Formulae E and F are valuable cortical hormones with high anti-inflammatory, low catabolic, glycogenic and thymolytic activities. In addition, they are anti-androgenic, anti-gonadotropic and anti-estrogenic hormones. Furthermore, they have topical activity in skin disorders such as psoriasis, allergic dermatitis and the like.

The novel compounds of the present invention are prepared by the process exemplified as follows:

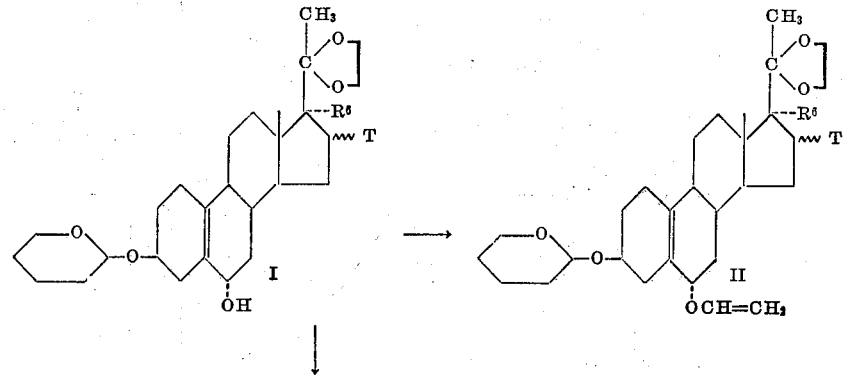

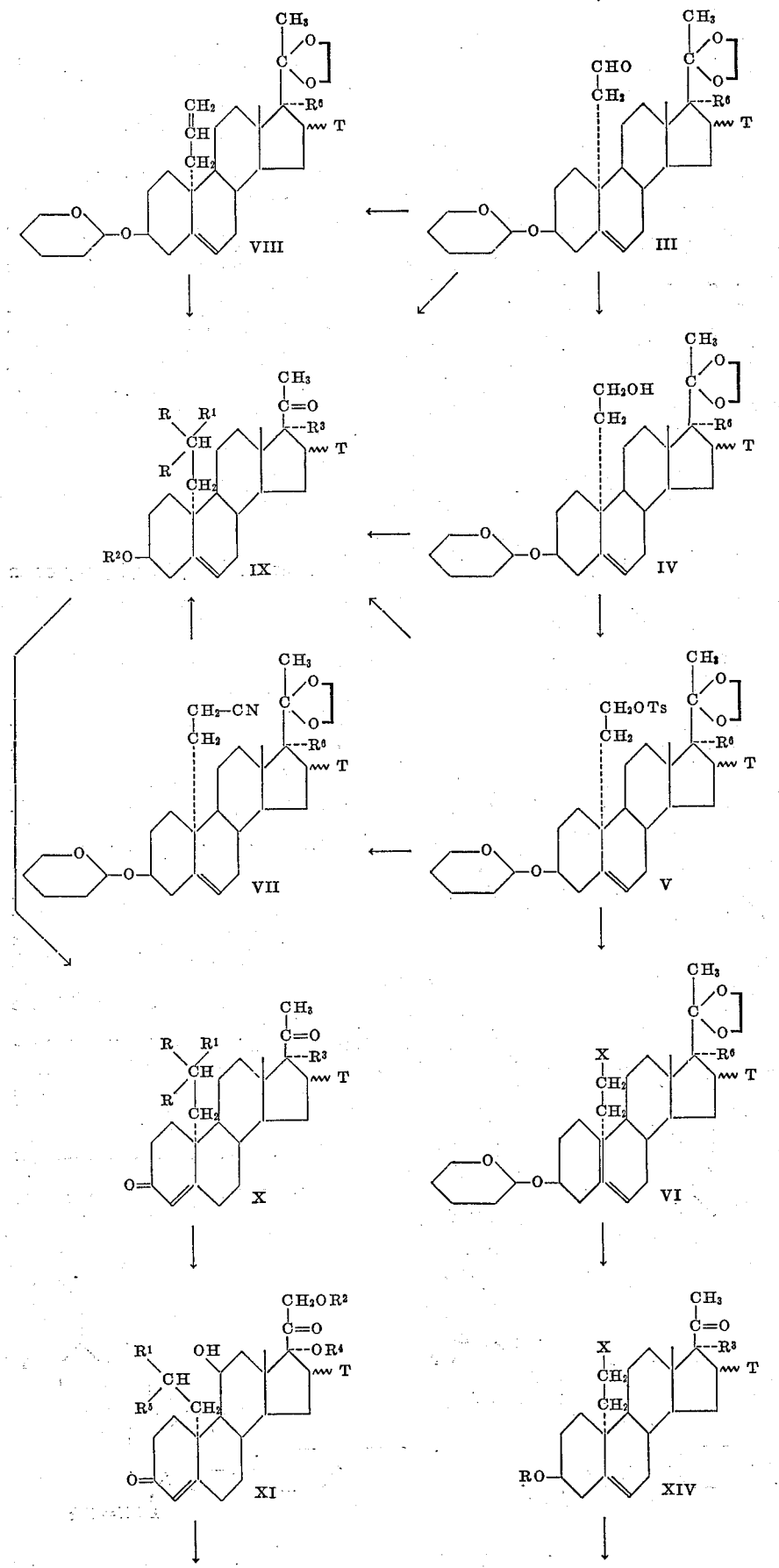

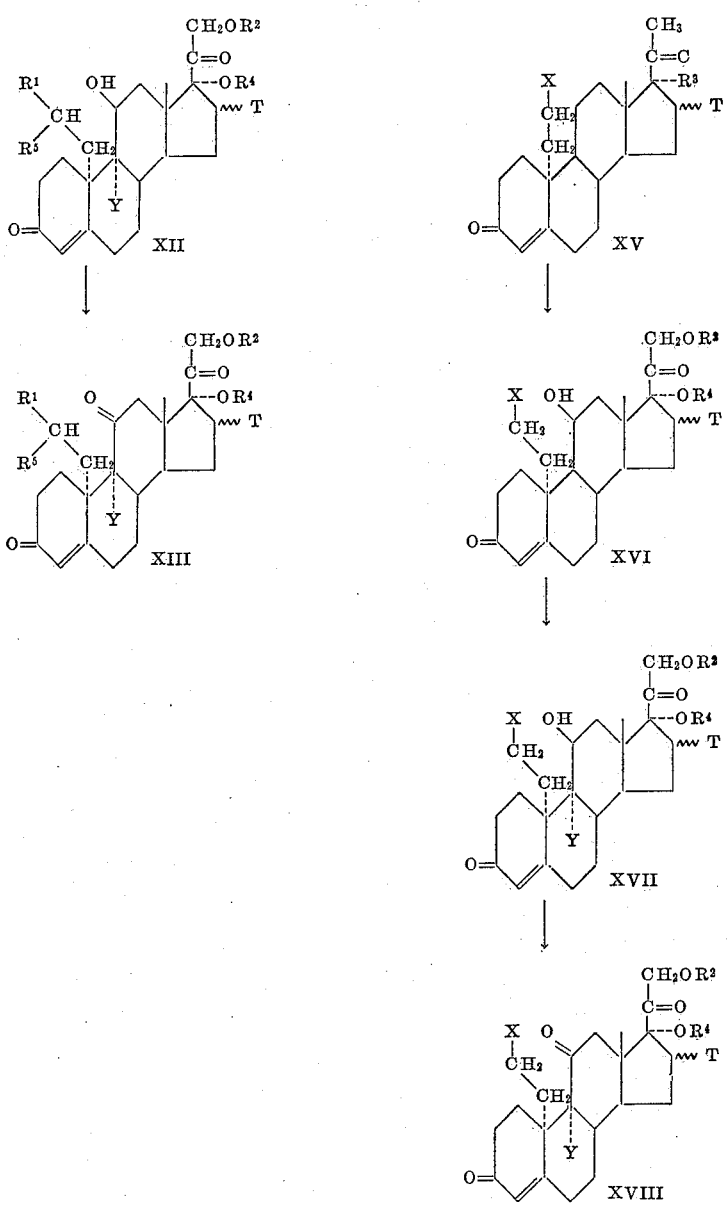

In the above formulae, R, $R^1$, $R^2$, $R^3$, $R^4$, $R^5$, X and Y have the same meaning as set forth hereinbefore; $R^6$ represents hydrogen or a tetrahydropyranyloxy grouping; and $R^6$ and T together have the same meaning as $R^3$ and T together.

In accordance with the above equation, the starting $3\beta$ - tetrahydropyranyloxy - 20 - cycloethylenedioxy-19-nor-$\Delta^{5(10)}$-pregnen-6α-ol(I) is treated with a lower alkyl vinyl ether e.g. ethyl vinyl ether, in the presence of a catalytic amount of a mercuric salt of a weak acid, such as mercuric acetate, for a period of time of the order of 10 hours, preferably at reflux temperature, to give the corresponding 6α-vinyloxy compound (II), which upon refluxing in a high boiling point solvent, e.g., Decalin, for about 4 hours, furnishes the corresponding 3β-tetrahydropyranyloxy-20-cycloethylenedioxy - 19 - formyl-$\Delta^5$-10α-pregnene derivative (III). The latter compound is conventionally reduced, as for example, with sodium borohydride, to give the corresponding 19-hydroxymethyl-$\Delta^5$-10α-pregnene (IV) which upon reaction with tosyl chloride in pyridine at 0° C. for about 24 hours, yields the corresponding 19 - tosyloxymethyl-$\Delta^5$-10α-pregnene (V). The latter compound is treated with an alkali metal halide such as potassium fluoride, lithium chloride or lithium bromide, or an alkali metal cyanide, such as potassium cyanide, in a suitable solvent, for example, dimethyl formamide or acetonitrile, at reflux temperature for about 5 hours to give, respectively, the corresponding 19-cyanomethyl-$\Delta^5$-10α-pregnene (VI), or the corresponding 19-cyanomethyl-$\Delta^5$-10α-pregnene (VII).

The 19-formyl compound (III) upon treatment with triphenyl phosphonium methyl bromide in the presence of a lower alkyl lithium, e.g., butyl lithium, in an inert solvent, such as ether, for about 14 hours, affords the corresponding 19 - vinyl - $\Delta^5$ - 10α - pregnene compound (VIII).

The compounds obtained by the methods described hereinbefore having a tetrahydropyranyloxy group at C-3 and/or C-17 and a cycloethylenedioxy grouping at C-20 (III, IV, V, VI, VII and VIII), are conventionally hydrolyzed in a weak acid medium to give the corresponding 20-keto-3β-hydroxy and/or 17α-hydroxy-$\Delta^5$-10α-pregnenes (IX and XIV), which upon treatment with a lower alkanone, such as cyclohexanone, in the presence of an aluminum lower alkoxide, e.g., aluminum isopropoxide, in an inert solvent, for example toluene, at reflux temperature for approximately 15 minutes afford the corresponding $\Delta^4$-10α-pregnene-3,20-dione compounds (X and XV). Any of the latter compounds having a 17α-hydroxyl or a 16α,17α-alkylidenedioxy grouping, with the exception of the 19-tosyloxy-methyl derivatives, upon treatment with iodine in the presence of calcium oxide gives the corresponding 21-iodo derivative, which is reacted with potassium acetate, in a suitable solvent, such as acetone, preferably at reflux temperature, thus affording the corresponding 21-acetoxy derivative, which, in turn, upon incubation with adrenal glands in a suitable medium, e.g. an aqueous solution of alkali metal phosphates and chlorides and in magnesium sulfate, mixed with an aqueous solution of fumaric acid and sodium hydroxide for a period of time of the order of 3 hours, at approximately 28–37° C., yields the corresponding 19-substituted $\Delta^4$-10α-pregnene-11β, 21-diol-3,20-dione (XI and XVI). The primary hydroxyl groups of the latter compound are protected by conventional conversion to the corresponding acyloxy derivative, which upon treatment with mesyl chloride in dimethyl formamide and pyridine at approximately 80° C., for about 30 minutes, produces the corresponding 19-substituted-$\Delta^{4,9(11)}$-10α-pregnadien-21-ol-3,20-dione primary alcohol acylate. The latter derivative is treated with an N-bromoamide or imide, such as N-bromoacetamide, in the presence of perchloric acid, in an inert solvent, such as for example dioxane to give the corresponding $\Delta^4$-9α-bromo-11β-ol which upon treatment with a mild base, such as potassium acetate, in a suitable solvent, e.g., acetone, preferably at reflux temperature, afford the corresponding 19-substituted-9β,11β-oxido-$\Delta^4$-10α-pregnen-21-ol-3,20-dione primary alcohol acylate. The latter 9β,11β-oxido compound, upon treatment with a hydrogen halide, such as hydrogen fluoride or hydrogen chloride, in a suitable inert organic solvent, e.g., methylene chloride or chloroform, yields the corresponding 19 - substituted - 9α-halo-$\Delta^4$-10α-pregnene-11β, 21-diol-3,20-dione primary alcohol acylate (XII and XVII; Y=halogen). The 11β-hydroxyl group of the latter compound and of the corresponding 9α-unsubstituted-11β-hydroxy compound (XI and XVI) is oxidized conventionally, e.g., with Jones' reagent (chromium trioxide in sulfuric acid-water) thus affording the corresponding 11-ketone (XIII and XVIII).

The compounds of the present invention having a 21-acyloxy group, may be saponified by conventional treatment with a base to produce the corresponding 21-free alcohols which, in turn, may be acylated conventionally in pyridine with an acylating agent to give the corresponding 21-acylates, wherein the acyl group may be different from the previously saponified one.

The compounds of the present invention having a primary and/or a 3β-hydroxyl group, are conventionally acylated in pyridine with an acylating agent, such as an anhydride or a chloride of a hydrocarbon carboxylic acid of the type described hereinbefore, to give the corresponding acylates.

The compounds of the present invention having in the molecule a primary and/or a 3β- and/or or tertiary hydroxyl group, (e.g. at C–17), are conventionally esterified in the presence of p-toluenesulfonic acid with an acylating agent, such as acetic anhydride, caproic anhydride, cyclopentylpropionic anhydride, or enanthic anhydride, to produce the corresponding esters.

The following specific examples serve to illustrate but are not intended to limit the scope of the present invention.

PREPARATION 1

To a solution of 4 g. of the 3-acetate of $\Delta^5$-pregnene-3β,19-diol-20-one in 150 cc. of dry benzene, were added 6 g. of lead tetraacetate and 8 g. of calcium carbonate and the mixture was refluxed for 2 hours. It was cooled, filtered, water was added to the filtrate, the benzene layer was separated, washed with water and the benzene was evaporated under reduced pressure; upon chromatography of the residue on neutral alumina, there was obtained the diacetate of 19-nor-$\Delta^{5(10)}$-pregnene-3β,6β-diol-20-one.

A mixture of 2 g. of the diacetate of 19-nor-$\Delta^{5(10)}$-pregnene-3β,6β-diol-20-one, 25 cc. of dry benzene, 10 cc. of ethylene glycol and 50 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded the diacetate of 20-cycloethylenedioxy-19-nor-$\Delta^{5(10)}$-pregnene-3β,6β-diol.

A solution of 0.17 g. of potassium hydroxide in 0.2 cc. of water and 2.5 cc. of methanol was added over 30 minutes to a boiling solution of 1.5 g. of the latter compound in 30 cc. of methanol. Boiling was continued for a further 2 hours and the solution was then cooled, neutralized with acetic acid and concentrated under reduced pressure. Addition of water, followed by crystallization of the precipitated solid from acetone-hexane, produced 20-cycloethylenedioxy-19-nor-$\Delta^{5(10)}$-pregnene-3β,6β-diol.

A mixture of 1.2 g. of the latter steroid in 20 cc. of dioxane, and 1.1. molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 20-cycloethylenedioxy-19-nor-$\Delta^{5(10)}$-pregnen-3β-ol-6-one.

2 cc. of dihydropyrane were added to a solution of 1 g. of the latter steroid in 15 cc. of benzene and about 1 cc. was distilled to remove moisture. 0.4 g. of p-toluenesulfonic acid were added to the cooled solution, which was then allowed to stand at room temperature for 24 hours. The solution was washed with sodium carbonate and water, dried and evaporated. The residue was chromatographed on 15 g. of neutral alumina. Crystallization of the fractions eluted with hexane from pentane yielded 3β - tetrahydropyranyloxy-20-cycloethylenedioxy-19-nor-$\Delta^{5(10)}$-pregnen-6-one.

A solution of 0.5 g. of the latter steroid in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material which was chromatographed on alumina to give 3β-tetrahydropyranyloxy-20-cycloethylenedioxy-19-nor-$\Delta^{5(10)}$-pregnen-6α-ol.

The starting compounds listed under I were treated by the same sequence of reactions thus giving the corresponding final products set forth under II.

| I | II |
|---|---|
| 3-acetate of 16α-methyl-$\Delta^5$-pregnene-3β, 19-diol-20-one. | 3β-tetrahydropyranyloxy-20-cycloethylenedioxy-16α-methyl-19-nor-$\Delta^{5(10)}$-pregnen-6α-ol. |
| 3-acetate of 16β-methyl-$\Delta^5$-pregnene-3β, 19-diol-20-one. | 3β-tetrahydropyranyloxy-20-cycloethylenedioxy-16β-methyl-19-nor-$\Delta^{5(10)}$-pregnen-6α-ol. |
| 3-acetate of 16α, 17α-isopropylidenedioxy-$\Delta^5$-pregnene-3β, 19-diol-20-one. | 3β-tetrahydropyranyloxy-20-cycloethylenedioxy-16α, 17α-isopropylidenedioxy-19-nor-$\Delta^{5(10)}$-pregnen-6α-ol. |
| 3,17-diacetate of $\Delta^5$-pregnene-3β, 17α,19-triol-20-one. | 3β,17α-bis-tetrahydropyranyloxy-20-cycloethylenedioxy-19-nor-$\Delta^{5(10)}$-pregnen-6α-ol. |
| 3,17-diacetate of 16α-methyl-$\Delta^5$-pregnene-3β,17α,19-triol-20-one. | 3β,17α-bis-tetrahydropyranyloxy-20-cycloethylenedioxy-16α-methyl-19-nor-$\Delta^{5(10)}$-pregnen-6α-ol. |

Example I

A mixture of 5 g. of 3β-tetrahydropyranyloxy-20-cycloethylenedioxy-19-nor-Δ$^{5(10)}$-pregnen-6α-ol, 3 g. of freshly crystallized mercuric acetate and 100 cc. of purified ethyl vinyl ether was refluxed for 10 hours. The resulting mixture was cooled, washed with cold aqueous sodium carbonate solution, dried and concentrated to a small volume. The concentrate was chromatographed on alumina, thus giving 3β-tetrahydropyranyloxy-20-cycloethylenedioxy-6α-vinyloxy-19-nor-Δ$^{5(10)}$-pregnene (Compound No. 1).

The compounds listed hereinafter under I were treated by the same procedure, thus giving the corresponding products set forth under II.

| I | Cpd. No. | II |
|---|---|---|
| 3β-tetrahydropyranyloxy-20-cycloethylenedioxy-16α-methyl-19-nor-Δ$^{5(10)}$-pregnen-6α-ol. | 2 | 3β-tetrahydropyranyloxy-20-cycloethylenedioxy-6α-vinyloxy-16α-methyl-19-nor-Δ$^{5(10)}$-pregnene. |
| 3β-tetrahydropyranyloxy-20-cycloethylenedioxy-16β-methyl-19-nor-Δ$^{5(10)}$-pregnen-6α-ol. | 3 | 3β-tetrahydropyranyloxy-20-cycloethylenedioxy-6α-vinyloxy-16β-methyl-19-nor-Δ$^{5(10)}$-pregnene. |
| 3β-tetrahydropyranyloxy-20-cycloethylenedioxy-16α,17α-isopropylidenedioxy-19-nor-Δ$^{5(10)}$-pregnen-6α-ol. | 4 | 3β-tetrahydropyranyloxy-20-cycloethylenedioxy-6α-vinyloxy-16α,17α-isopropylidenedioxy-19-nor-Δ$^{5(10)}$-pregnene. |
| 3β,17α-bis-tetrahydropyranyloxy-20-cycloethylenedioxy-19-nor-Δ$^{5(10)}$-pregnen-6α-ol. | 5 | 3β,17α-bis-tetrahydropyranyloxy-20-cycloethylenedioxy-6α-vinyloxy-19-nor-Δ$^{5(10)}$-pregnene. |
| 3β,17α-bis-tetrahydropyranyloxy-20-cycloethylenedioxy-16α-methyl-19-nor-Δ$^{5(10)}$-pregnen-6α-ol. | 6 | 3β,17α-bis-tetrahydropyranyloxy-20-cycloethylenedioxy-6α-vinyloxy-16α-methyl-19-nor-Δ$^{5(10)}$-pregnene. |

Example II

A mixture of 1 g. of compound No. 1 and 10 cc. of Decalin was refluxed, under nitrogen, for 4 hours, then it was evaporated to dryness under reduced pressure. The resulting residue was crystallized from acetone-hexane, thus giving 3β-tetrahydropyranyloxy-20-cycloethylenedioxy-19-formyl-Δ$^5$-10α-pregnene (Cpd. No. 7).

The compounds Nos. 2 to 6, inclusive, were treated by the above procedure thus giving respectively.

Cpd. No.:
  8. 3β - tetrahydropyranyloxy - 20 - cycloethylenedioxy-19-formyl-16α-methyl-Δ$^5$-10α-pregnene
  9. 3β - tetrahydropyranyloxy - 20 - cycloethylenedioxy-19-formyl-16β-methyl-Δ$^5$-10α-pregnene
  10. 3β - tetrahydropyranyloxy - 20 - cycloethylenedioxy - 19 - formyl - 16α,17α - isopropylidenedioxy-Δ$^5$-10-α-pregnene
  11. 3β,17α - bis - tetrahydropyranyloxy - 20 - cycloethylenedioxy-19-formyl-Δ$^5$-10α-pregnene
  12. 3β,17α - bis - tetrahydropyranyloxy - 20 - cycloethylenedioxy - 19 - formyl - 16α - methyl - Δ$^5$-10α-pregnene

Example III

A solution of 1 g. of sodium borohydride in 3 cc. of water was added to an ice-cooled solution of 1 g. of compound No. 7 in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 3β-tetrahydropyranyloxy - 20 - cycloethylenedioxy - 19 - hydroxymethyl-Δ$^5$-10α-pregnene (Cpd. No. 13).

The compounds Nos. 8 to 12, inclusive, were treated by the latter procedure, thus affording respectively.

Cpd. No.:
  14. 3β - tetrahydropyranyloxy - 20 - cycloethylenedioxy - 19 - hydroxymethyl - 16α - methyl - Δ$^5$-10α-pregnene
  15. 3β - tetrahydropyranyloxy - 20 - cycloethylenedioxy - 19 - hydroxymethyl - 16β - methyl - Δ$^5$-10α-pregnene
  16. 3β - tetrahydropyranyloxy - 20 - cycloethylenedioxy - 19 - hydroxymethyl - 16α,17α - isopropylidenedioxy-Δ$^5$-10α-pregnene
  17. 3β,17α - bis - tetrahydropyranyloxy - 20 - cycloethylenedioxy - 19 - hydroxymethyl - Δ$^5$ - 10α-pregnene
  18. 3β,17α - bis - tetrahydropyranyloxy - 20 - cycloethylenedioxy - 19 - hydroxymethyl - 16α - methyl-Δ$^5$-10α-pregnene

Example IV

A solution of 1 g. of compound No. 13 in 5 cc. of pyridine was treated with 0.5 g. of tosyl chloride and kept at 0° C. for 24 hours, it was then diluted with water and the precipitate separated by filtration, thus giving 3β-tetrahydropyranyloxy - 20 - cycloethylenedioxy - 19-tosyloxymethyl-Δ$^5$-10α-pregnene (Cpd. No. 19).

The compounds Nos. 14 to 18, inclusive, were treated by the same procedure, thus yielding respectively.

Cpd. No.:
  20. 3β-tetrahydropyranyloxy - 20-cycloethylenedioxy-19 - tosyloxymethyl - 16α - methyl - Δ$^5$-10α-pregnene
  21. 3β - tetrahydropyranyloxy - 20 - cycloethylenedioxy - 19 - tosyloxymethyl - 16β - methyl - Δ$^5$-10α-pregnene
  22. 3β - tetrahydropyranyloxy - 20 - cycloethylenedioxy - 19 - tosyloxymethyl - 16α,17α - isopropylidenedioxy-Δ$^5$-10α-pregnene
  23. 3β,17α - bis - tetrahydropyranyloxy - 20 - cycloethylenedioxy-19-tosyloxymethyl-Δ$^5$-10α-pregnene
  24. 3β,17α - bis - tetrahydropyranyloxy - 20 - cycloethylenedioxy - 19 - tosyloxymethyl - 16α - methyl-Δ$^5$-10α-pregnene

Example V

A suspension of 10 g. of potassium fluoride in 50 cc. of dimethyl formamide was heated to boiling and then a solution of 2 g. of compound No. 19 in 10 cc. of dimethyl formamide was added. The mixture was refluxed for 5 hours, cooled and poured into water. The formed precipitate was filtered off and crystallized to give 3β-tetrahydropyranyloxy - 20 - cycloethylenedioxy-19-fluoromethyl-Δ$^5$-10α-pregnene (Cpd. No. 25).

The compounds Nos. 20 to 24, inclusive, were treated by the same procedure, thus affording respectively:

Cpd. No.:
  26. 3β-tetrahydropyranyloxy-20-cycloethylenedioxy-19-fluoromethyl-16α-methyl-Δ$^5$-10α-pregnene
  27. 3β-tetrahydropyranyloxy-20-cycloethylenedioxy-19-fluoromethyl-16β-methyl-Δ$^5$-10α-pregnene
  28. 3β-tetrahydropyranyloxy-20-cycloethylenedioxy-19-fluoromethyl-16α,17α-isopropylidenedioxy-Δ$^5$-10α-pregnene
  29. 3β,17α-bis-tetrahydropyranyloxy-20-cycloethylenedioxy-19-fluoromethyl-Δ$^5$-10α-pregnene
  30. 3β,17α-bis-tetrahydropyranyloxy-20-cycloethylenedioxy-19-fluoromethyl-16α-methyl-Δ$^5$-10α-pregnene

Example VI

The starting compounds of Example V were treated following exactly the procedure set forth in that example, except that potassium fluoride was substituted by lithium chloride, thus giving respectively:

Cpd. No.:
31. 3β-tetrahydropyranyloxy-20-cycloethylenedioxy-19-chloromethyl-Δ⁵-10α-pregnene
32. 3β-tetrahydropyranyloxy-20-cycloethylenedioxy-19-chloromethyl-16α-methyl-Δ⁵-10α-pregnene
33. 3β-tetrahydropyranyloxy-20-cycloethylenedioxy-19-chloromethyl-16β-methyl-Δ⁵-10α-pregnene
34. 3β-tetrahydropyranyloxy-20-cycloethylenedioxy-19-chloromethyl-16α,17α-isopropylidenedioxy-Δ⁵-10α-pregnene
35. 3β,17α-bis-tetrahydropyranyloxy-20-cycloethylenedioxy-19-chloromethyl-Δ⁵-10α-pregnene
36. 3β,17α-bis-tetrahydropyranyloxy-20-cycloethylenedioxy-19-chloromethyl-16α-methyl-Δ⁵-10α-pregnene

*Example VII*

The starting compounds of Example V were treated in accordance with said example except that lithium bromide was used instead of potassium fluoride, thus furnishing respectively:

Cpd. No.:
37. 3β-tetrahydropyranyloxy-20-cycloethylenedioxy-19-bromomethyl-Δ⁵-10α-pregnene
38. 3β-tetrahydropyranyloxy-20-cycloethylenedioxy-19-bromomethyl-16α-methyl-Δ⁵-10α-pregnene
39. 3β-tetrahydropyranyloxy-20-cycloethylenedioxy-19-bromomethyl-16β-methyl-Δ⁵-10α-pregnene
40. 3β-tetrahydropyranyloxy-20-cycloethylenedioxy-19-bromomethyl-16α,17α-isopropylidenedioxy-Δ⁵-10α-pregnene
41. 3β,17α-bis-tetrahydropyranyloxy-20-cycloethylenedioxy-19-bromomethyl-Δ⁵-10α-pregnene
42. 3β,17α-bis-tetrahydropyranyloxy-20-cycloethylenedioxy-19-bromomethyl-16α-methyl-Δ⁵-10α-pregnene

*Example VIII*

The starting compounds of Example V were treated following the procedure described in said example, except that potassium fluoride was substituted by potassium cyanide and acetonitrile was used instead of dimethyl formamide thus giving respectively:

Cpd. No.:
43. 3β-tetrahydropyranyloxy-20-cycloethylenedioxy-19-cyanomethyl-Δ⁵-10α-pregnene
44. 3β-tetrahydropyranyloxy-20-cycloethylenedioxy-19-cyanomethyl-16α-methyl-Δ⁵-10α-pregnene
45. 3β-tetrahydropyranyloxy-20-cycloethylenedioxy-19-cyanomethyl-16β-methyl-Δ⁵-10α-pregnene
46. 3β-tetrahydropyranyloxy-20-cycloethylenedioxy-19-cyanomethyl-16α,17α-isopropylidenedioxy-Δ⁵-10α-pregnene
47. 3β,17α-bis-tetrahydropyranyloxy-20-cycloethylenedioxy-19-cyanomethyl-Δ⁵-10α-pregnene
48. 3β,17α-bis-tetrahydropyranyloxy-20-cycloethylenedioxy-19-cyanomethyl-16α-methyl-Δ⁵-10α-pregnene

*Example IX*

A suspension of 14.5 g. of triphenylphosphonium methyl bromide in 250 cc. of anhydrous ether was treated, under an atmosphere of nitrogen, with 40 cc. of 1 N ethereal solution of butyl lithium and the mixture was stirred for 2 hours at room temperature. A solution of 5 g. of compound No. 7 in 100 cc. of ether was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave 3β-tetrahydropyranyloxy - 20 - cycloethylenedioxy - 19 - vinyl - Δ⁵-10α-pregnene (Cpd. No. 49).

The compounds Nos. 8 to 12, inclusive, were treated exactly by the same method, to give respectively:

Cpd. No.:
50. 3β-tetrahydropyranyloxy-20-cycloethylenedioxy-19-vinyl-16α-methyl-Δ⁵-10α-pregnene
51. 3β-tetrahydropyranyloxy-20-cycloethylenedioxy-19-vinyl-16β-methyl-Δ⁵-10α-pregnene
52. 3β-tetrahydropyranyloxy-20-cycloethylenedioxy-19-vinyl-16α,17α-isopropylidenedioxy-Δ⁵-10α-pregnene
53. 3β,17α-bis-tetrahydropyranyloxy-20-cycloethylenedioxy-19-vinyl-Δ⁵-10α-pregnene
54. 3β,17α-bis-tetrahydropyranyloxy-20-cycloethylenedioxy-19-vinyl-16α-methyl-Δ⁵-10α-pregnene

*Example X*

To a solution of 1 g. of compound No. 7 in 30 cc. of acetic acid was added 0.5 cc. of 2 N hydrochloric acid. After 1 hour at room temperature, ice water was added and the product extracted with methylene chloride. The extract was washed to neutral, dried over anhydrous sodium sulfate and evaporated to dryness. Crystallization from acetonehexane yielded 19-formyl-Δ⁵-10α-pregnen-3β-ol-20-one (Cpd. No. 55).

The compounds Nos. 8 to 54, inclusive, were treated following the same procedure, thus giving, respectively, the following compounds:

Cpd. No.:
56. 19-formyl-16α-methyl-Δ⁵-10α-pregnen-3β-ol-20-one
57. 19-formyl-16β-methyl-Δ⁵-10α-pregnen-3β-ol-20-one
58. 19-formyl-16α,17α-isopropylidenedioxy-Δ⁵-10α-pregnen-3β-ol-20-one
59. 19-formyl-Δ⁵-10α-pregnene-3β,17α-diol-20-one
60. 19-formyl-16α-methyl-Δ⁵-10α-pregnene-3β,17α-diol-20-one
61. 19-hydroxymethyl-Δ⁵-10α-pregnen-3β-ol-20-one
62. 19-hydroxymethyl-16α-methyl-Δ⁵-10α-pregnen-3β-ol-20-one
63. 19-hydroxymethyl-16β-methyl-Δ⁵-10α-pregnen-3β-ol-20-one
64. 19-hydroxymethyl-16α,17α-isopropylidenedioxy-Δ⁵-10α-pregnen-3β-ol-20-one
65. 19-hydroxymethyl-Δ⁵-10α-pregnene-3β,17α-diol-20-one
66. 19-hydroxymethyl-16α-methyl-Δ⁵-10α-pregnene-3β,17α-diol-20-one
67. 19-tosyloxymethyl-Δ⁵-10α-pregnen-3β-ol-20-one
68. 19-tosyloxymethyl-16α-methyl-Δ⁵-10α-pregnen-3β-ol-20-one
69. 19-tosyloxymethyl-16β-methyl-Δ⁵-10α-pregnen-3β-ol-20-one
70. 19-tosyloxymethyl-16α,17α-isopropylidenedioxy-Δ⁵-10α-pregnen-3β-ol-20-one
71. 19-tosyloxymethyl-Δ⁵-10α-pregnene-3β,17α-diol-20-one
72. 19-tosyloxymethyl-16α-methyl-Δ⁵-10α-pregnene-3β,17α-diol-20-one
73. 19-fluoromethyl-Δ⁵-10α-pregnen-3β-ol-20-one
74. 19-fluoromethyl-16α-methyl-Δ⁵-10α-pregnen-3β-ol-20-one
75. 19-fluoromethyl-16β-methyl-Δ⁵-10α-pregnen-3β-ol-20-one
76. 19-fluoromethyl-16α,17α-isopropylidenedioxy-Δ⁵-10α-pregnen-3β-ol-20-one
77. 19-fluoromethyl-Δ⁵-10α-pregnene-3β,17α-diol-20-one Cpd. No.—Continued
78. 19-fluoromethyl-16α-methyl-Δ⁵-10α-pregnene-3β,17α-diol-20-one
79. 19-chloromethyl-Δ⁵-10α-pregnen-3β-ol-20-one
80. 19-chloromethyl-16α-methyl-Δ⁵-10α-pregnen-3β-ol-20-one
81. 19-chloromethyl-16β-methyl-Δ⁵-10α-pregnen-3β-ol-20-one
82. 19-chloromethyl-16α,17α-isopropylidenedioxy-Δ⁵-10α-pregnen-3β-ol-20-one
83. 19-chloromethyl-Δ⁵-10α-pregnene-3β,17α-diol-20-one
84. 19-chloromethyl-16α-methyl-Δ⁵-10α-pregnene-3β,17α-diol-20-one
85. 19-bromomethyl-Δ⁵-10α-pregnen-3β-ol-20-one
86. 19-bromomethyl-16α-methyl-Δ⁵-10α-pregnen-3β-ol-20-one
87. 19-bromomethyl-16β-methyl-Δ⁵-10α-pregnen-3β-ol-20-one
88. 19-bromomethyl-16α,17α-isopropylidenedioxy-Δ⁵-10α-pregnen-3β-ol-20-one
89. 19-bromomethyl-Δ⁵-10α-pregnene-3β,17α-diol-20-one
90. 19-bromomethyl-16α-methyl-Δ⁵-10α-pregnene-3β,17α-diol-20-one
91. 19-cyanomethyl-Δ⁵-10α-pregnen-3β-ol-20-one
92. 19-cyanomethyl-16α-methyl-Δ⁵-10α-pregnen-3β-ol-20-one
93. 19-cyanomethyl-16β-methyl-Δ⁵-10α-pregnen-3β-ol-20-one
94. 19-cyanomethyl-16α,17α-isopropylidenedioxy-Δ⁵-10α-pregnen-3β-ol-20-one
95. 19-cyanomethyl-Δ⁵-10α-pregnene-3β,17α-diol-20-one
96. 19-cyanomethyl-16α-methyl-Δ⁵-10α-pregnene-3β,17α-diol-20-one
97. 19-vinyl-Δ⁵-10α-pregnen-3β-ol-20-one
98. 19-vinyl-16α-methyl-Δ⁵-10α-pregnen-3β-ol-20-one
99. 19-vinyl-16β-methyl-Δ⁵-10α-pregnen-3β-ol-20-one
100. 19-vinyl-16α,17α-isopropylidenedioxy-Δ⁵-10α-pregnen-3β-ol-20-one
101. 19-vinyl-Δ⁵-10α-pregnene-3β,17α-diol-20-one
102. 19-vinyl-16α-methyl-Δ⁵-10α-pregnene-3β,17α-diol-20-one

*Example XI*

A solution of 1 g. of compound No. 55 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 15 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 19-formyl-Δ⁴-10α-pregnene-3,20-dione (Cpd. No. 103).

The compounds Nos. 56 to 102, inclusive, were treated by the latter procedure, thus giving respectively:

Cpd. No.:
104. 19-formyl-16α-methyl-Δ⁴-10α-pregnene-3,20-dione
105. 19-formyl-16β-methyl-Δ⁴-10α-pregnene-3,20-dione
106. 19-formyl-16α,17α-isopropylidenedioxy-Δ⁴-10α-pregnene-3,20-dione
107. 19-formyl-Δ⁴-10α-pregnen-17α-ol-3,20-dione
108. 19-formyl-16α-methyl-Δ⁴-10α-pregnen-17α-ol-3,20-dione Cpd. No.—Continued
109. 19-hydroxymethyl-Δ⁴-10α-pregnen-3,20-dione
110. 19-hydroxymethyl-16α-methyl-Δ⁴-10α-pregnene-3,20-dione
111. 19-hydroxymethyl-16β-methyl-Δ⁴-10α-pregnene-3,20-dione
112. 19-hydroxymethyl-16α,17α-isopropylidenedioxy-Δ⁴-10α-pregnene-3,20-dione
113. 19-hydroxymethyl-Δ⁴-10α-pregnen-17α-ol-3,20-dione
114. 19-hydroxymethyl-16α-methyl-Δ⁴-10α-pregnen-17α-ol-3,20-dione
115. 19-tosyloxymethyl-Δ⁴-10α-pregnene-3,20-dione
116. 19-tosyloxymethyl-16α-methyl-Δ⁴-10α-pregnene-3,20-dione
117. 19-tosyloxymethyl-16β-methyl-Δ⁴-10α-pregnene-3,20-dione
118. 19-tosyloxymethyl-16α,17α-isopropylidenedioxy-Δ⁴-10α-pregnene-3,20-dione
119. 19-tosyloxymethyl-Δ⁴-10α-pregnen-17α-ol-3,20-dione
120. 19-tosyloxymethyl-16α-methyl-Δ⁴-10α-pregnen-17α-ol-3,20-dione
121. 19-fluoromethyl-Δ⁴-10α-pregnene-3,20-dione
122. 19-fluoromethyl-16α-methyl-Δ⁴-10α-pregnene-3,20-dione
123. 19-fluoromethyl-16β-methyl-Δ⁴-10α-pregnene-3,20-dione
124. 19-fluoromethyl-16α,17α-isopropylidenedioxy-Δ⁴-10α-pregnene-3,20-dione
125. 19-fluoromethyl-Δ⁴-10α-pregnen-17α-ol-3,20-dione
126. 19-fluoromethyl-16α-methyl-Δ⁴-10α-pregnen-17α-ol-3,20-dione
127. 19-chloromethyl-Δ⁴-10α-pregnene-3,20-dione
128. 19-chloromethyl-16α-methyl-Δ⁴-10α-pregnene-3,20-dione
129. 19-chloromethyl-16β-methyl-Δ⁴-10α-pregnene-3,20-dione
130. 19-chloromethyl-16α,17α-isopropylidenedioxy-Δ⁴-10α-pregnene-3,20-dione
131. 19-chloromethyl-Δ⁴-10α-pregnen-17α-ol-3,20-dione
132. 19-chloromethyl-16α-methyl-Δ⁴-10α-pregnen-17α-ol-3,20-dione
133. 19-bromomethyl-Δ⁴-10α-pregnene-3,20-dione
134. 19-bromomethyl-16α-methyl-Δ⁴-10α-pregnene-3,20-dione
135. 19-bromomethyl-16β-methyl-Δ⁴-10α-pregnene-3,20-dione
136. 19-bromomethyl-16α,17α-isopropylidenedioxy-Δ⁴-10α-pregnene-3,20-dione
137. 19-bromomethyl-Δ⁴-10α-pregnen-17α-ol-3,20-dione
138. 19-bromomethyl-16α-methyl-Δ⁴-10α-pregnen-17α-ol-3,20-dione
139. 19-cyanomethyl-Δ⁴-10α-pregnene-3,20-dione
140. 19-cyanomethyl-16α-methyl-Δ⁴-10α-pregnene-3,20-dione
141. 19-cyanomethyl-16β-methyl-Δ⁴-10α-pregnene-3,20-dione
142. 19-cyanomethyl-16α,17α-isopropylidenedioxy-Δ⁴-10α-pregnene-3,20-dione
143. 19-cyanomethyl-Δ⁴-10α-pregnen-17α-ol-3,20-dione
144. 19-cyanomethyl-16α-methyl-Δ⁴-10α-pregnen-17α-ol-3,20-dione
145. 19-vinyl-Δ⁴-10α-pregnene-3,20-dione
146. 19-vinyl-16α-methyl-Δ⁴-10α-pregnene-3,20-dione
147. 19-vinyl-16β-methyl-Δ⁴-10α-pregnene-3,20-dione
148. 19-vinyl-16α,17α-isopropylidenedioxy-Δ⁴-10α-pregnene-3,20-dione
149. 19-vinyl-Δ⁴-10α-pregnen-17α-ol-3,20-dione Cpd. No.—Continued
150. 19-vinyl-16α-methyl-Δ⁴-10α-pregnen-17α-ol-3,20-dione

Example XII

A mixture of 1 g. of compound No. 55, 4 cc. of pyridine and 2 cc. of acetic anhydride was kept at room temperature overnight, poured into ice water, the formed precipitate was filtered, washed with water and dried. Crystallization from acetone-hexane gave 19-formyl-Δ⁵-10α-pregnen-3β-ol-20-one acetate (Cpd. No. 151).

The compounds Nos. 59, 62, 65, 70, 73, 83, 91 and 97, were treated by the same procedure, thus giving respectively:

Cpd. No.
152. 19-formyl-Δ⁵-10α-pregnene-3β,17α-diol-20-one 3-acetate
153. 19-acetoxymethyl-16α-methyl-Δ⁵-10α-pregnen-3β-ol-20-one acetate
154. 19-acetoxymethyl-Δ⁵-10α-pregnene-3β,17α-diol-20-one 3-acetate
155. 19-tosyloxymethyl-Δ⁵-10α-pregnen-3β-ol-20-one acetate
156. 19-fluoromethyl-Δ⁵-10α-pregnen-3β-ol-20-one acetate
157. 19-chloromethyl-Δ⁵-10α-pregnene-3β,17α-diol-20-one 3-acetate
158. 19-cyanomethyl-Δ⁵-10α-pregnen-3β-ol-20-one acetate
159. 19-vinyl-Δ⁵-10α-pregnen-3β-ol-20-one acetate.

Example XIII

The starting compounds of Example XII were treated following exactly the procedure described in that example, except that acetic anhydride was substituted by caproic anhydride, propionic anhydride, enanthic anhydride and cyclopentylpropionic anhydride, thus affording respectively the corresponding caproates, propionates, enanthates and cyclopentylpropionates of said starting compounds.

Example XIV

To a solution of 5 g. of compound No. 59 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-formyl-Δ⁵-10α-pregnene-3β,17α-diol-20-one dicaproate (Cpd. No. 160).

The compounds Nos. 65, 72, 77, 84, 95, 102, 152, 154, and 157 were treated by the same procedure, thus yeilding respectively:

Cpd. No.:
161. 19-caproxymethyl-Δ⁵-10α-pregnene-3β,17α-diol-20-one dicaproate
162. 19-tosyloxymethyl-16α-methyl-Δ⁵-10α-pregnene-3β-,17α-diol-20-one dicaproate
163. 19-fluoromethyl-Δ⁵-10α-pregnene-3β-17α-diol-20-one dicaproate
164. 19-chloromethyl-16α-methyl-Δ⁵-10α-pregnene-3β,17α-diol-20-one dicaproate
165. 19-cyanomethyl-Δ⁵-10α-pregnene-3β,17α-diol-20-one dicaproate
166. 19-vinyl-16α-methyl-Δ⁵-10α-pregnene-3β,17α-diol-20-one dicaproate
167. 19-formyl-Δ⁵-10α-pregnene-3β,17α-diol-20-one 3-acetate-17-caproate
168. 19-acetoxymethyl-Δ⁵-10α-pregnene-3β,17α-diol-20-one 3-acetate-17-caproate
169. 19-chloromethyl-Δ⁵-10α-pregnene-3β,17α-diol-20-one 3-acetate-17-caproate.

Cpd. No.—Continued
The compounds Nos. 107, 108, 113, 114, 125, 132, 143, and 149, were treated following exactly the same procedure, to give respectively:

Cpd. No.:
170. 19-formyl-Δ⁴-10α-pregnen-17α-ol-3,20-dione caproate
171. 19-formyl-16α-methyl-Δ⁴-10α-pregnen-17α-ol-3,20-dione caproate
172. 19-caproxymethyl-Δ⁴-10α-pregnen-17α-ol-3,20-dione caproate
173. 19-caproxymethyl-16α-methyl-Δ⁴-10α-pregnen-17α-ol-2,30-dione caproate
174. 19-fluoromethyl-Δ⁴-10α-pregnen-17α-ol-3,20-dione caproate
175. 19-chloromethyl-16α-methyl-Δ⁴-10α-pregnen-17α-ol-3,20-dione caproate
176. 19-cyanomethyl-Δ⁴-10α-pregnen-17α-ol-3,20-dione caproate
177. 19-vinyl-Δ⁴-10α-pregnen-17α-ol-3,20-dione caproate

Example XV

The starting compounds of Example XIV were treated following exactly the procedure described in that example, except that caproic anhydride was substituted by acetic anhydride, propionic anhydride, enanthic anhydride and cyclopentylpropionic anhydride, thus affording respectively the corresponding acetates, propionates, enanthates, and cyclopentylpropionates of said starting compounds.

Example XVI

A cooled solution of 4 g. of compound No. 107 in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium triosulfate. After stirring for 15 minutes the solution was decanted and the precipitate was collected by filtration, thus giving 21-iodo-19-formyl-16α,17α-isopropylidene dioxy-Δ⁴-10α-pregnene-3,20-dione (Cpd. No. 178). This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 19-formyl-16α,17α-isopropylidene-dioxy-Δ⁴-10α-pregnen-21-ol-3,20-dione acetate (Cpd. No. 179).

The following solutions "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until an homogeneous mass was obtained; to 1 kg. of homogenate was added 2 liters of the mixture of A, B, and C solutions with vigorous stirring. To the mixture there was then added 1 g. of compound No. 179 dissolved in 5.35 parts of propylenglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. Chromatography on alumina and crystallization of the solid fractions afforded 19 - formyl - 16α,17α - isopropylidenedioxy - Δ⁴ - 10α-pregnene-11β,21-diol-3,20-dione (Cpd. No. 180).

The compounds Nos. 107, 108, 112, 113, 114, 124, 125, 126, 130, 131, 132, 136, 137, 138, 142, 143, 144, 148, 149 and 150 were treated by the same sequence of reactions, thus affording firstly the corresponding 21-iodo compounds, then the corresponding 21-acetoxy compounds and finally the following respective products:

Cpd. No.:
- 181. 19 - formyl - Δ⁴-10α-pregnene-11β,17α-21-triol-3,20-dione
- 182. 19 - formyl - 16α - methyl-Δ⁴-10α-pregnene-11β,17α,21-triol-3,20-dione
- 183. 19 - hydroxymethyl-16α,17α-isopropylidenedioxy-Δ⁴-10α-pregnene-11β,21-diol-3,20-dione
- 184. 19 - hydroxymethyl - Δ⁴-10α-pregnene-11β,17α,-21-triol-3,20-dione
- 185. 19 - hydroxymethyl - 16α-methyl-Δ⁴-10α-pregnene-11β,17α,21-triol-3,20-dione
- 186. 19 - fluoromethyl - 16α,17α-isopropylienedioxy-Δ⁴-10α-pregnene-11β,21-diol-3,20-dione
- 187. 19 - fluoromethyl - Δ⁴-10α-pregnene-11β,17α,21-triol-3,20-dione
- 188. 19 - fluoromethyl - 16α-methyl-Δ⁴-10α-pregnene-11β,17α,21-triol-3,20-dione
- 189. 19 - chloromethyl - 16α,17α-isopropylidenedioxy-Δ⁴-10α-pregnene-11β,21-diol-3,20-dione
- 190. 19 - chloromethyl - Δ⁴-10α-pregnene-11β,17α,21-triol-3,20-dione
- 191. 19 - chloromethyl - 16α-methyl-Δ⁴-10α-pregnene-11β,17α,21-triol-3,20-dione
- 192. 19 - bromomethyl - 16α,17α-isopropylidenedioxy-Δ⁴-10α-pregnene-11β,21-diol-3,20-dione
- 193. 19 - bromomethyl-Δ⁴-10α-pregnene-11β,17α,21-triol-3,20-dione
- 194. 19 - bromomethyl-16α-methyl-Δ⁴-10α-pregnene-11β,17α,21-triol-3,20-dione
- 195. 19 - cyanomethyl-16α,17α-isopropylidenedioxy-Δ⁴-10α-pregnene-11β,21-diol-3,20-dione
- 196. 19 - cyanomethyl-Δ⁴-10α-pregnene-11β,17α,21-triol-3,20-dione
- 197. 19 - cyanomethyl-16α-methyl-Δ⁴-10α-pregnene-11β,17α,21-triol-3,20-dione
- 198. 19 - vinyl-16α,17α-isopropylidenedioxy-Δ⁴-10α-pregnene-11β,21-diol-3,20-dione
- 199. 19 - vinyl-Δ⁴-10α-pregnene-11β,17α,21-triol-3,-20-dione
- 200. 19 - vinyl - 16α-methyl-Δ⁴-10α-pregnene-11β,-17α,21-triol-3,20-dione.

*Example XVII*

A mixture of 10 g. of compound No. 180, 40 cc. of pyridine and 20 cc. of acetic anhydride was kept at room temperature overnight, poured into ice water, the formed precipitate was filtered, washed with water and dried. Crystallization from acetone-hexane gave 19-formyl-16α,-17α - isopropylidenedioxy - Δ⁴-10α-pregnene-11β,21-diol-3,20-dione 21-acetate (Cpd. No. 201).

9 g. of compound No. 201 was dissolved with slow heating in 125 cc. of dimethylformamide, the mixture was cooled, 4.5 g. of mesyl chloride and 5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 19 - formyl - 16α,17α-isopropylidenedioxy-Δ⁴,⁹⁽¹¹⁾-10α-pregnadien-21-ol-3,20-dione acetate (Cpd. No. 202).

2.8 g. of N-bromoacetamide were added to a mixture of 5 g. of compound No. 202, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained 9α - bromo - 19-formyl-16α,17α-isopropylidenedioxy-Δ⁴-10α-pregnene-11β,21-diol-3,20-dione 21-acetate (Cpd. No. 203).

A mixture of 2 g. of anhydrous potassium acetate and 20 cc. of acetone was heated almost to boiling and then a solution of 1.7 g. of the latter bromohydrin in 20 c. of acetone was added slowly while stirring; the mixture was then refluxed for 10 hours, cooled and almost all of the acetone was distilled off; iced-water was then added, the precipitate was filtered, washed with water and dried. Upon recrystallization from ethylene chloride-benzene there was obtained 9β,11β-oxido-19-formyl-16α,17α-isopropylidenedioxy-Δ⁴-10α-pregnen-21-ol-3,20-dione acetate (Cpd. No. 204).

In a polyethylene flask, adapted with magnetic stirrer, there was dissolved 1.8 g. of compound No. 204 in 30 cc. of methylene chloride, the solution was cooled to 0° C. and a solution of 2.11 g. of anhydrous hydrogen fluoride in 3.7 cc. of tetrahydrofurane cooled in a Dry Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 9α-fluoro-19-formyl - 16α,17α - isopropylidenedioxy-Δ⁴-10α-pregnene-11β,21-diol-3,20-dione 21-acetate (Cpd. No. 205).

The compounds Nos. 181 to 200, inclusive, were treated by the same sequence of reactions thus affording firstly the correspdoning acetates of the primary alcohols, secondly the corresponding Δ⁴,⁹⁽¹¹⁾-acetates, thirdly the corresponding 9α - bromo - 11β - hydroxy derivatives, fourthly the corresponding 9β,11β-oxido compounds, and finally, respectively, the following compounds:

Cpd. No.:
- 206. 9α-fluoro-19-formyl-Δ⁴-10α-pregene-11β,17α,21-triol-3,20-dione 21-acetate
- 207. 9α-fluoro-19-formyl-16α-methyl-Δ⁴-10α-pregnene-11β,17α,21-triol-3,20-dione 21-acetate
- 208. 9α-fluoro-19-acetoxymethyl-16α,17α-isopropylidenedioxy-Δ⁴-10α-pregnene-11β,21-diol-3,20-dione 21-acetate
- 209. 9α-fluoro-19-acetoxymethyl-Δ⁴-10α-pregnene-11β,17α,21-triol-3,20-dione 21-acetate
- 210. 9α-fluoro-19-acetoxymethyl-16α-methyl-Δ⁴,-10α-pregnene-11β,17α,21-triol-3,20-dione 21-acetate
- 211. 9α-fluoro-19-fluoromethyl-16α,17α-isopropylidenedioxy-Δ⁴-10α-pregnene-11β,21-diol-3,20-dione 21-acetate
- 212. 9α-fluoro-19-fluoromethyl-Δ⁴-10α-pregnene-11β,17α,21-triol-3,20-dione 21-acetate
- 213. 9α-fluoro-19-fluoromethyl-16α-methyl-Δ⁴-10α-pregnene-11β,17α,21-triol-3,20-dione 21-acetate
- 214. 9α-fluoro-19-chloromethyl-16α,17α-isopropylidenedioxy-Δ⁴-10α-pregnene-11β,21-diol-3,20-dione 21-acetate Cpd. No.—Continued
215. 9α-fluoro-9-chloromethyl-Δ⁴-10α-pregnene-11β,17α,21-triol-3,20-dione 21-acetate
216. 9α-fluoro-19-chloromethyl-16α-methyl-Δ⁴-10α-pregnene-11β,17α,21-triol-3,20-dione 21-acetate
217. 9α-fluoro-19-bromomethyl-16α,17α-isopropylidenedioxy-Δ⁴-10α-pregnene-11β,21-diol-3,20-dione 21-acetate
218. 9α-fluoro-19-bromomethyl-Δ⁴-10α-pregnene-11β,17α,21-triol-3,20-dione 21-acetate
219. 9α-fluoro-19-bromomethyl-16α-methyl-Δ⁴-10α-pregnene-11β,17α,21-triol-3,20-dione 21-acetate
220. 9α-fluoro-19-cyanomethyl-16α,17α-isopropylidenedioxy-Δ⁴-10α-pregnene-11β,21-diol-3,20-dione 21acetate
221. 9α-fluoro-19-cyanomethyl-Δ⁴-10α-pregnene-11β,17α,21-triol-3,20-dione 21-acetate
222. 9α-fluoro-19-cyanomethyl-16α-methyl-Δ⁴-10α-pregnene-11β,17α,21-triol-3,20-dione 21-acetate
223. 9α-fluoro-19-vinyl-16α,17α-isopropylidenedioxy-Δ⁴-10α-pregnene-11β,21-diol-3,20-dione 21-acetate
224. 9α-fluoro-19-vinyl-Δ⁴-10α-pregnene-11β,17α,21-triol-3,20-dione 21-acetate
225. 9α-fluoro-19-vinyl-16α-methyl-Δ⁴-10α-pregnene-11β,17α,21-triol-3,20-dione 21-acetate.

*Example XVIII*

To a solution of 4 g. of compound No. 204 in 40 cc. of anhydrous chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 9α-chloro-19-formyl-16α,17α - isopropylidenedioxy - Δ⁴ - 10α - pregnene-11β,21-diol-3,20-dione 21-acetate (Cpd. No. 226).

The rest of the 9β,11β-oxido compounds obtained according to Example XVII were treated by the latter procedure, to give:

Cpd. No.:
227. 19-chloro-19-formyl-Δ⁴-10α-pregnene-11β,17α,21-triol-3,20-dione 21-acetate
228. 19-chloro-19-formyl-16α-methyl-Δ⁴-10α-pregnene-11β,17α,21-triol-3,20-dione 21-acetate
229. 19-chloro-19-acetoxymethyl-16α,17α-isopropylidenedioxy-Δ⁴-10α-pregnene-11β,21-diol-3,20-dione 21-acetate
230. 19-chloro-19-acetoxymethyl-Δ⁴-10α-pregnene-11β,17α,21-triol-3,20-dione 21-acetate
231. 19-chloro-19-acetoxymethyl-16α-methyl-Δ⁴-10α-pregnene-11β,17α,21-triol-3,20-dione 21-acetate
232. 19-chloro-19-fluoromethyl-16α,17α-isopropylidenedioxy-Δ⁴-10α-pregnene-11β,21-diol-3,20-dione 21-acetate
233. 19-chloro-19-fluoromethyl-Δ⁴-10α-pregnene-11β,17α,21-triol-3,20-dione 21-acetate
234. 19-chloro-19-fluoromethyl-16α-methyl-Δ⁴-10α-pregnene-11β,17α,21-triol-3,20-dione 21-acetate
235. 19-chloro-19-chloromethyl-16α,17α-isopropylidenedioxy-Δ⁴-10α-pregnene-11β,21-diol-3,20-dione 21-acetate
236. 19-chloro-19-chloromethyl-Δ⁴-10α-pregnene-11β,17α,21-triol-3,20-dione 21-acetate
237. 19-chloro-19-chloromethyl-16α-methyl-Δ⁴-10α-pregnene-11β,17α,21-triol-3,20-dione 21-acetate
238. 19-chloro-19-bromomethyl-16α,17α-isopropylidenedioxy-Δ⁴-10α-pregnene-11β,21-diol-3,20-dione 21-acetate
239. 19-chloro-19-bromomethyl-Δ⁴-10α-pregnene-11β,17α,21-triol-3,20-dione 21-acetate
240. 19-chloro-19-bromomethyl-16α-methyl-Δ⁴-10α-pregnene-11β,17α,21-triol-3,20-dione 21-acetate
241. 19-chloro-19-cyanomethyl-16α,17α-isopropylidenedioxy-Δ⁴-10α-pregnene-11β,21-diol-3,20-dione 21-acetate
242. 19-chloro-19-cyanomethyl-Δ⁴-10α-pregnene-11β,17α,21-triol-3,20-dione 21-acetate
243. 19-chloro-19-cyanomethyl-16α-methyl-Δ⁴-10α-pregnene-11β,17α,21-triol-3,20-dione 21-acetate
244. 19-chloro-19-vinyl-16α,17α-isopropylidenedioxy-Δ⁴-10α-pregnene-11β,21-diol-3,20-dione 21-acetate
245. 19-chloro-19-vinyl-Δ⁴-10α-pregnene-11β,17α,21-triol-3,20-dione 21-acetate
246. 19-chloro-19-vinyl-16α-methyl-Δ⁴-10α-pregnene-11β,17α,21-triol-3,20-dione 21-acetate

*Example XIX*

A solution of 1 g. of compound No. 201 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19-formyl - 16α,17α-isopropylidenedioxy-Δ⁴-10α-pregnen-21-ol-3,11,20-trione acetate (Cpd. No. 247).

The rest of the 11β-hydroxy-21-acetates obtained according to Example XVII were treated by the same procedure, thus giving the corresponding 11-keto-21-acetates.

The compounds Nos. 226 to 246, inclusive, were treated by the latter procedure, thus affording the corresponding 11-ketones.

*Example XX*

A suspension of 1 g. of compound No. 205 in 60 cc. of methanol was treated with a solution of 1 g. of potassium carbonate in 6 cc. of water; the mixture was boiled under reflux for 1 hour, then cooled in ice and diluted with water. The formed precipitate was collected and recrystallized from acetone-hexane to yield 9α-fluoro-19-formyl-16α,17α-isoproylidenediory - Δ⁴-10α-pregnene-11β, 21-diol-3,20-dione (Cpd. No. 248).

The compounds Nos. 206 to 246, inclusive, were treated by the latter procedure, thus affording the corresponding free alcohols.

*Example XXI*

The compound No. 247 was treated according to Example XX, thus yielding 19-formyl-16α,17α-isopropylidene-dioxy-Δ⁴-10α-pregnen - 21-ol-3,11,20-trione (Cpd. No. 249).

The rest of the compounds obtained in accordance with Example XIX were treated by the same procedure thus affording the corresponding free alcohols.

*Example XXII*

A mixture of 10 g. of compound No. 248, 40 cc. of pyridine and 20 cc. of caproic anhydride was kept at room temperature overnight, poured into ice water, the formed precipitate was filtered, washed with water and dried. Crystallization from acetone-hexane gave 9α-fluoro-19-formyl-16α,17α-isopropylidenedioxy-Δ⁴-10α-pregnene-11β, 21-diol-3,20-dione 21-caproate (Cpd. No. 250).

The rest of the compounds obtained according to example XX and all the compounds obtained according to Example XXI were treated by the same procedure, thus giving the corresponding caproates.

Example XXIII

The starting compounds of Example XXII were treated following exactly the procedure described in that Example, except that caproic anhydride was substituted by propionic anhydride, enanthic anhydride and cyclopentylpropionic anhydride, thus affording respectively the corresponding propionates, enanthates, and cyclopentylpropionates of said starting compounds.

I claim:

1. A compound of the following formula:

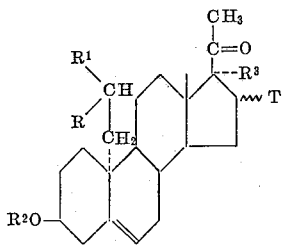

wherein R is selected from the group consisting of hydroxyl, tosyloxy, a hydrocarbon carboxylic acyloxy group of less than 13 carbon atoms and a cyano group; $R^1$ is hydrogen; R and $R^1$ taken together are selected from the group consisting of an oxo group and a methylene grouping; $R^2$ is selected from the group consisting of hydrogen and a hydrocarbon carboxylic acyl group of less than 12 carbon atoms; $R^3$ is a member of the group consisting of hydrogen, hydroxyl and a hyrocarbon carboxylic acyloxy group of less than 12 carbon atoms; T is selected from the group consisting of hydrogen and methyl; and $R^3$ and T, together, form a 16α, 17α-lower alkylidenedioxy grouping.

2. A compound of the following formula:

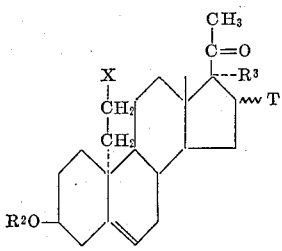

wherein X is a halogen atom having an atomic weight of less than 125; $R^2$ is selected from the group consisting of hydrogen and a hydrocarbon carboxylic acyl group of less than 12 carbon atoms; $R^3$ is a member of the group consisting of hydrogen, hydroxyl and a hydrocarbon carboxylic acyloxy group of less than 12 carbon atoms; T is selected from the group consisting of hydrogen and methyl; and $R^3$ and T, together, form a 16α,17α-lower alkylidenedioxy grouping.

3. A compound of the following formula:

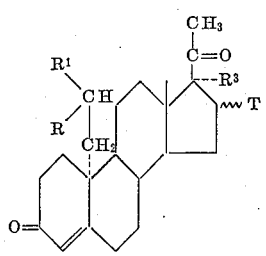

wherein R is selected from the group consisting of hydroxyl, tosyloxy, a hydrocarbon carboxylic acyloxy group of less than 12 carbon atoms and a cyano group; $R^1$ is hydrogen; R and $R^1$ taken together are methylene; $R^3$ is a member of the group consisting of hydrogen, hydroxyl and a hydrocarbon carboxylic acyloxy group of less than 12 carbon atoms; T is selected from the group consisting of hydrogen and methyl; and $R^3$ and T, together, form a 16α,17α-lower alklidenedioxy grouping.

4. A compound of the following formula:

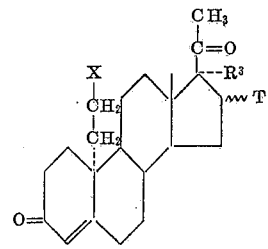

wherein X is a halogen atom having an atomic weight of less than 125; $R^3$ is a member of the group consisting of hydrogen, hydroxyl and a hydrocarbon carboxylic acyloxy group of less than 12 carbon atoms; T is selected from the group consisting of hydrogen and methyl; and $R^3$ and T, together, form a 16α,17α-lower alkylidenedioxy grouping.

5. A compound of the following formula:

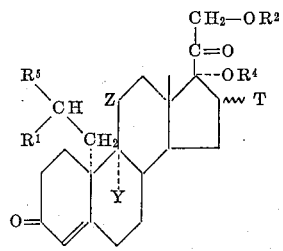

wherein $R^5$ is selected from the group consisting of hydroxyl, a hydrocarbon carboxylic acyloxy group of less than 12 carbon atoms and a cyano group; $R^1$ is hydrogen; $R^5$ and $R^1$ taken together are methylene; $R^2$ is selected from the group consisting of hydrogen and a hydrocarbon carboxylic acyl group of less than 12 carbon atoms; $R^4$ is hydrogen; T is selected from the group consisting of hydrogen and methyl; $OR^4$ and T, together, form a 16α, 17α-lower alkylidenedioxy grouping; and Y is selected from the group consisting of hydrogen and a halogen atom having an atomic weight of less than 125; Z is a member of the group consisting of β-hydroxyl and an oxo group.

6. A compound of the following formula:

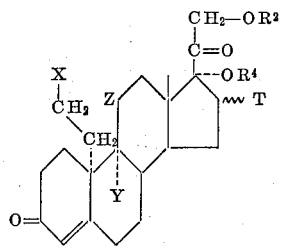

wherein X is a halogen atom having an atomic weight of less than 125; Y is selected from the group consisting of hydrogen and a halogen atom having an atomic weight of less than 125; Z is a member of the group consisting of β-hydroxyl and an oxo group; $R^2$ is selected from the group consisting of hydrogen and a hydrocarbon carboxylic acyl group of less than 12 carbon atoms; $R^4$ is hydrogen; T is selected from the group consisting of hydrogen and methyl; and $OR^4$ and T, together, form a 16α, 17α-lower alkylidenedioxy grouping.

7. 19-formyl-Δ⁵-10α-pregnen-3β-ol-20-one.

8. 19 - formyl - 16α - methyl - Δ⁵ - 10α - pregnen - 3β - ol-20-one.

9. 19 - formyl - 16β - methyl - Δ⁵ - 10α - pregnen - 3β - ol-20-one.

10. 19-formyl - 16α,17α-isopropylidenedioxy - Δ⁵-10α-pregnen-3β-ol-20-one.

11. 19-formyl-$\Delta^5$-10α-pregnen-3β,17α-diol-20-one.
12. 19 - formyl - 16α - methyl - $\Delta^5$ - 10α - pregnene - 3β,17α-diol-20-one.
13. 19-hydroxymethyl-16α - methyl - $\Delta^5$ - 10α - pregnene-3β,17α-diol-20-one.
14. 19 - hydroxymethyl - $\Delta^5$ - 10α - pregnene - 3β,17α-diol-20-one.
15. 19 - fluoromethyl - $\Delta^5$ - 10α - pregnene - 3β,17α-diol-20-one.
16. 19-fluoromethyl - 16α - methyl - $\Delta^5$ - 10α - pregnene-3β,17α-diol-20-one.
17. 19 - chloromethyl - 16α - methyl - $\Delta^5$ - 10α - pregnene-3β,17α-diol-20-one.
18. 19 - chloromethyl - $\Delta^5$ - 10α - pregnene - 3β,17α-diol-20-one.
19. 19 - cyanomethyl - $\Delta^5$ - 10α - pregnene - 3β,17α-diol-20-one.
20. 19 - cyanomethyl - 16α - methyl - $\Delta^5$ - 10α - pregnene-3β,17α-diol-20-one.
21. 19-vinyl-16α-methyl-$\Delta^5$-10α-pregnene - 3β,17α-diol-20-one.
22. 19-vinyl-$\Delta^5$-10α-pregnene-3β,17α-diol-20-one.

References Cited by the Examiner

UNITED STATES PATENTS 3,205,228  9/1965  Bowers _____ 260—239.55

LEWIS GOTTS, *Primary Examiner.*

HENRY A. FRENCH, *Assistant Examiner.*